(12) United States Patent
Hsu et al.

(10) Patent No.: US 12,586,606 B1
(45) Date of Patent: Mar. 24, 2026

(54) AUDIO ALIGNMENT SYSTEMS AND TECHNIQUES

(71) Applicant: MOISES SYSTEMS, INC., Salt Lake City, UT (US)

(72) Inventors: Eddie Gueiros Hsu, Paraíba (BR); Joaquim Breno Brito Cavalcante, Paraíba (BR); Geraldo Ramos, Salt Lake City, UT (US)

(73) Assignee: MOISES SYSTEMS, INC., Salt Lake City, UT (US)

( * ) Notice: Subject to any disclaimer, the term of this patent is extended or adjusted under 35 U.S.C. 154(b) by 0 days.

(21) Appl. No.: 19/242,228

(22) Filed: Jun. 18, 2025

(51) Int. Cl.
    *G11B 27/02* (2006.01)
    *G06F 3/16* (2006.01)

(52) U.S. Cl.
    CPC .............. *G11B 27/02* (2013.01); *G06F 3/165* (2013.01)

(58) Field of Classification Search
    CPC ................................ G11B 27/02; G06F 3/165
    See application file for complete search history.

(56) References Cited

U.S. PATENT DOCUMENTS

| | | | | |
|---|---|---|---|---|
| 9,462,230 | B1 * | 10/2016 | Agrawal | ................ G06Q 50/20 |
| 10,236,006 | B1 | 3/2019 | Gurijala et al. | |
| 10,284,985 | B1 | 5/2019 | Chaudhary et al. | |
| 10,638,180 | B1 | 4/2020 | Pringle et al. | |
| 2013/0216206 | A1 * | 8/2013 | Dubin | ................ G11B 27/031 |
| | | | | 386/282 |

| | | | | |
|---|---|---|---|---|
| 2014/0108020 | A1 * | 4/2014 | Sharma | ................ G10L 19/028 |
| | | | | 704/500 |
| 2014/0142958 | A1 * | 5/2014 | Sharma | ................ G10L 19/018 |
| | | | | 704/500 |
| 2016/0358595 | A1 * | 12/2016 | Sung | ................ G11B 27/34 |
| 2019/0335283 | A1 * | 10/2019 | Chaudhary | ............ G10L 25/51 |
| 2022/0270621 | A1 * | 8/2022 | Ales | ................ G11B 27/105 |
| 2025/0078857 | A1 * | 3/2025 | Lu | ................ G10L 25/30 |
| 2025/0104738 | A1 | 3/2025 | Hsu et al. | |

OTHER PUBLICATIONS

International Search Report and Written Opinion received for PCT Patent Application No. PCT/US2025/034540, mailed on Sep. 17, 2025, 12 pages.

* cited by examiner

*Primary Examiner* — James T Tsai
(74) *Attorney, Agent, or Firm* — Workman Nydegger

(57) ABSTRACT

A system is configurable to: after receiving first user input, (i) initiate playback of selected audio content at one or more playback components and (ii) initiate audio recording at one or more recording components to obtain recorded audio content, the recorded audio content being recorded at least partially during the playback of the selected audio content; process the selected audio content and the recorded audio content as inputs to an alignment module to generate a temporal offset value, wherein the alignment module is configured to generate the temporal offset value by correlating feature frames of the selected audio content with feature frames of the recorded audio content; and after receiving second user input, initiate synchronized playback of the selected audio content and the recorded audio content, wherein the recorded audio content is synchronized with the selected audio content using the temporal offset value.

20 Claims, 7 Drawing Sheets

400

*t* ⟶

*t* ⟶

*t* ⟶

System 700

Processor(s)
702

Storage
704

Sensor(s)
706

Communication
System(s)
710

Remote System(s)
712

Input/Output
System(s)
708

AUDIO ALIGNMENT SYSTEMS AND TECHNIQUES

CROSS-REFERENCE TO RELATED APPLICATIONS

N/A

BACKGROUND

Musicians practice music using a variety of methods. One common approach involves playing or singing along with a pre-recorded music track, which is played back using one or more playback devices such as speakers, smartphones, computers, audio interfaces, etc. This allows for practice in the context of the full arrangement, supporting work on timing, intonation, dynamics, ensemble cohesion, and/or other aspects of music performance.

For example, a guitar player might set up a speaker or stereo system to play a recording of a song. While the track is playing, the guitarist plays along using a guitar, synchronizing with the original recording and allowing the guitarist to focus on technique, rhythm, integration with the rest of the music, etc. In some cases, the playback track is a specially prepared version in which the guitar part has been removed or de-emphasized, enabling the guitarist to supply that part during the practice session.

In another example, a singer might use headphones to listen to a song during a vocal practice session. The singer may perform along with the track while listening to the accompaniment, allowing the singer to concentrate on pitch, phrasing, expression, etc. The track used may be a karaoke version or a modified mix in which the original vocals are partially or fully removed.

The subject matter claimed herein is not limited to embodiments that solve any challenges or that operate only in environments such as those described above. Rather, this background is only provided to illustrate one exemplary technology area where some embodiments described herein may be practiced.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
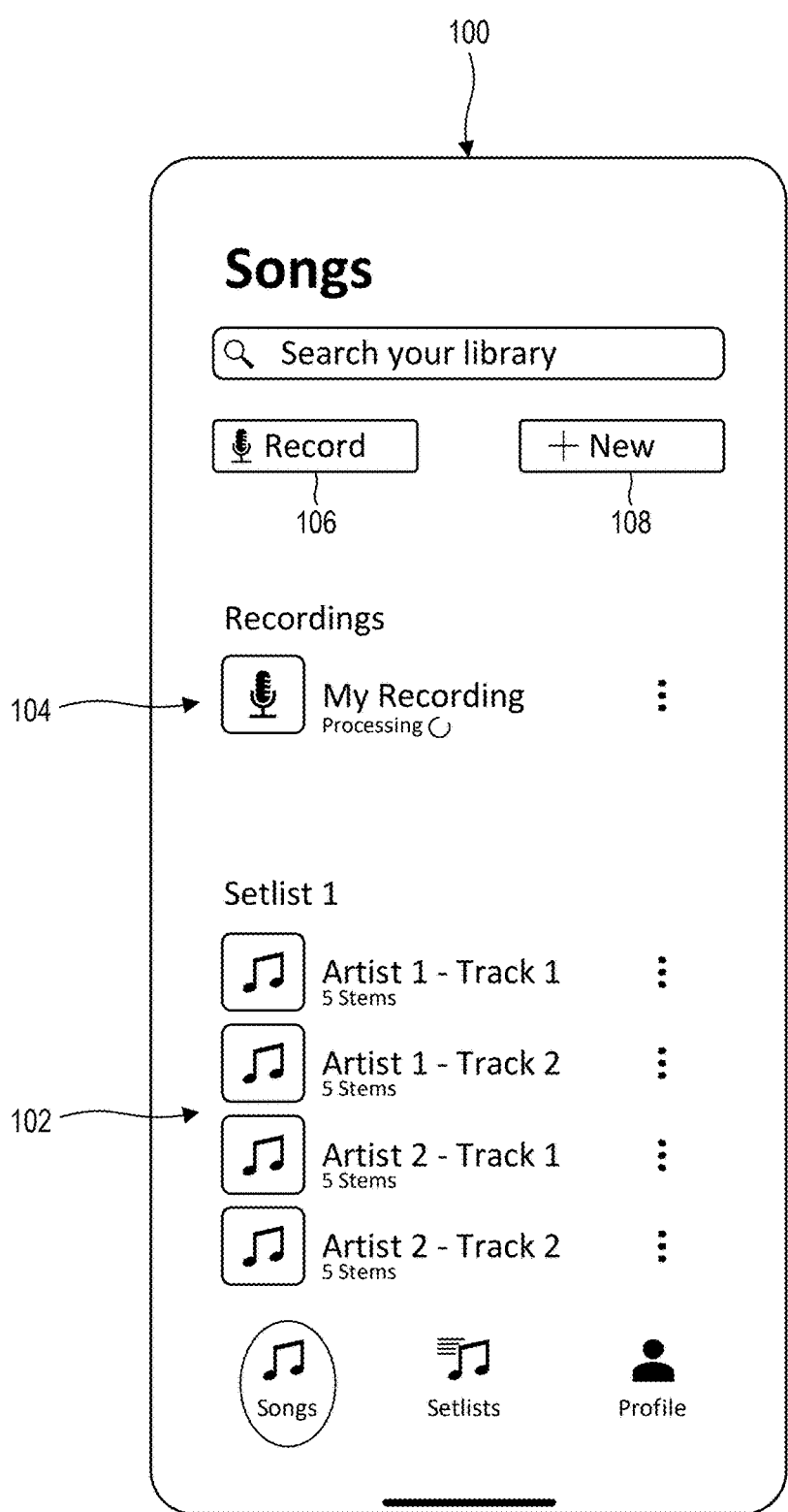
FIG. 1 illustrates a user interface for facilitating selection and/or acquisition of audio content.

Disclosed embodiments are directed to systems, devices, and techniques for aligning audio signals (e.g., represented in different audio files, tracks, recordings, streams, etc.).

As noted above, many musicians engage in practice sessions in which they play their musical instrument(s) and/or sing while listening to a song (e.g., a backing track). In many practice sessions, musicians not only perform along with pre-recorded music tracks but also record their own playing or singing (e.g., to support more structured evaluation and refinement). For instance, a guitarist may play along with a backing track (e.g., a mix with the guitar part) and simultaneously record the performance (e.g., via one or more recording components with one or more microphones and/or image sensors, and/or by connecting the guitar to a recording device or interface). The recorded guitar track can later be played back alongside the original backing track, either as separate tracks or by combining them into a single audio file for unified playback. This allows the musician to hear how the performance fits within the musical context, which can make it easier to identify timing issues, tonal inconsistencies, phrasing problems, and/or other issues that might not be apparent during live playing.

Latency introduced by playback devices (or other devices, such as audio interfaces, line-in connections for recording and/or playback devices, in-line components such as dongles/adapters, etc.) can introduce significant alignment errors in music practice sessions that involve simultaneous playback and recording. A common scenario involves a user device (e.g., a smartphone, tablet, laptop, desktop computer) being used both to initiate playback of a selected backing track and to record the musician's performance along with that track. If the user device is connected to a playback device that introduces audio delay (e.g., audio interfaces, wireless speakers, headphones, earbuds) the musician will hear the backing track with latency introduced by the playback device. As a result, although the musician attempts to perform in synchronization with the perceived playback, the audio being heard is delayed relative to the actual backing track timeline maintained by the user device. Consequently, the recorded performance becomes offset in time relative to the backing track, meaning that when the recorded performance and the backing track are later played back together (e.g., as separate tracks or as a single merged audio file), the musician's playing will appear delayed relative to the accompaniment. The recorded performance can additionally or alternatively become offset in time because of other components, such as recording devices (e.g., audio interfaces).

At least some disclosed embodiments are directed to techniques for compensating for delay that certain playback components (e.g., wireless and/or wired playback devices, or other components such as recording devices) may introduce into practice sessions that involve a musician playing an instrument (and/or singing) during playback of a backing track. For instance, a system may be configurable to initiate (i) playback of a backing track and (ii) recording of audio content, where the initiation of the playback and the recording is time-aligned (e.g., synchronized). However, the playback of the backing track may be facilitated by one or more wireless playback devices in communication with the system, causing delay/latency between then the recording is initiated and when the user hears and begins to play along with the backing track. To compensate for such delay, after system may process the backing track and the recorded audio content as inputs to an alignment module, which may output a temporal offset value indicative of the delay introduced by the wireless playback device(s). The alignment module may be configured to generate the temporal offset value by correlating feature frames of the backing track with feature frames of the recorded audio content. The temporal offset value may then be used to facilitate synchronized playback of the backing track and the recorded audio content (e.g., by delaying playback of the backing track to align with the recorded audio content, or by skipping/trimming the beginning of the recorded audio content to align with the backing track, etc.).

The techniques described herein for aligning recorded audio content with selected audio content (e.g., a backing track, or segment thereof) can advantageously compensate for delay/latency associated with wireless playback devices in a dynamic manner, accounting for variations in latency across different wireless communication protocols/standards, different wireless playback devices, and/or different contexts of use (e.g., a single wireless playback device can exhibit different latencies for different playback/recording sessions). Furthermore, the techniques described herein may leverage the selected and recorded audio content itself to facilitate the temporal alignment, which can advantageously avoid cumbersome user-interactive processes for determining the temporal offset to apply for synchronized playback (e.g., requiring users to input playback device information/characteristics, or perform calibration operations).

Having just described some of the various high-level features and benefits of the disclosed embodiments, attention will now be directed to the Figures, which illustrate various conceptual representations, architectures, methods, and/or supporting illustrations related to the disclosed embodiments.

FIG. 1 illustrates example features of a user interface 100 for facilitating selection and/or acquisition of audio content. One or more aspects of the user interface 100 (and other user interfaces frontend displays described herein) can be presented on various types of devices or systems, such as smartphones, tablets, laptop computers, desktop computers, wearable devices, and/or other devices (e.g., which devices or systems can correspond to or include components of system 700, described hereinafter with reference to FIG. 7). The user interface 100 can be presented on a user device in association with operation of a downloaded and/or web-based (e.g., server- or cloud-based) application (e.g., a music software application).

In the example shown in FIG. 1, the user interface 100 provides access to various audio content (e.g., corresponding to audio tracks 102) in the form of audio tracks 102 and recordings 104. The audio content may comprise one or more locally and/or remotely stored audio or recording files. The audio content can include data/information allowing for playback of associated audio when used in conjunction with a playback device. In some instances, selected audio content may comprise an audio stream (e.g., provided by a web streaming service, radio-based service, satellite service, line-in connection, etc.). In some implementations audio content may be added to the audio tracks 102 and/or the recordings 104 displayed in the user interface 100 via one or more user actions. For example, the user interface 100 includes a record button 106 and an add button 108. The record button 106 may be selectable via user input to facilitate acquisition of recorded content (e.g., audio and/or video) for inclusion with the recordings 104. Similarly, the add button 108 may be selectable via user input to facilitate selection of additional audio files/tracks (e.g., from a local or remote repository, or by selecting one or more music streaming or radio or other audio services) for inclusion with the audio tracks 102.

In some instances, the audio content represented in a user interface 100 includes one or more audio stems. For example, each of the audio tracks 102 are displayed in conjunction with an indicator of the quantity of audio stems (e.g., "5 Stems") associated with the respective audio track. Audio stems can refer to the component parts or individual audio sources represented in a complete musical track, such as vocals, drums, bass, guitar, keys/piano, and/or other sources of audio.

In the example shown in FIG. 1, the recordings 104 includes a newly recorded file referred to herein as "My Recording". My Recording may have been recorded after selection of the record button 106 of the user interface 100. The user interface 100 of FIG. 1 conceptually depicts processing of the My Recording file with the "Processing" label proximate to the My Recording label. The processing of audio content as indicated in FIG. 1 can comprise performing stem separation (e.g., to isolate individual audio stems represented in the audio content from one another), chord detection, beat detection, section detection, and/or other processes. Such processing may be performed on any content selected for inclusion in the audio tracks 102 and/or to the recordings 104.

Figure 2:
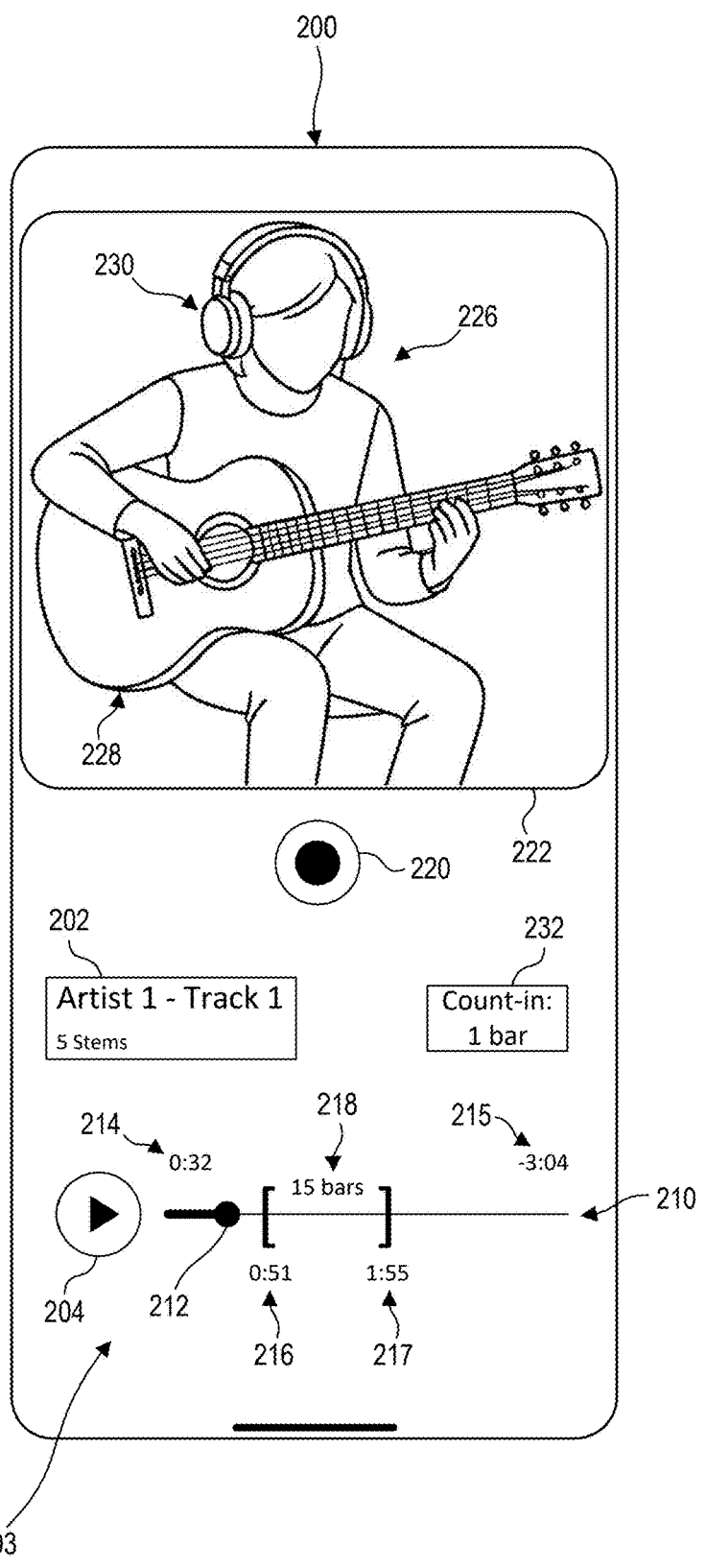
FIGS. 2, 3, and 4 illustrate example user interfaces for facilitating acquisition of recorded content during playback of selected audio content.

FIG. 2 illustrates example features of a user interface 200 for facilitating acquisition of recorded content during playback of selected audio content. For instance, user interface 200 indicates a selected backing track 202, which may comprise one of the audio tracks 102 described hereinabove (e.g., "Artist 1-Track 1"). The selected backing track 202 may be selected via user input (e.g., user input directed to the user interface element indicating the selected backing track 202 in the user interface 200 may surface a selection interface allowing the user to select from among the audio tracks 102, or another input framework or modality may be used).

The example user interface 200 shown in FIG. 2 includes various elements for interacting with selected backing track 202. For instance, the user interface 200 includes playback controls 203, which include a play/pause element 204 and a playback navigation bar 210 (e.g., for indicating playback progress and facilitating scrubbing/navigating through the selected backing track 202). The playback controls 203 further include a playback position marker 212 associated with the navigation bar 210 to indicate the current playback position for playing back the selected backing track 202 (e.g., "Artist 1-Track 1"). The user interface 200 further includes time indicators 214 and 215, which can indicate the current playback time for playback of the selected backing track 202 (e.g., time indicator 214), the remaining playback duration of the selected backing track 202 (e.g., time indicator 215), the total duration of the selected audio content, and/or other time-related information. The playback controls 203 can include additional or alternative components, such as navigation elements for navigating or skipping forward or backward in time by predetermined time intervals, such as 5 seconds, 10 seconds, etc., and/or other features.

In the example shown in FIG. 2, one or more users (represented by user 226) may intend to play back the selected backing track 202 while recording the user(s) playing one or more musical instruments (e.g., guitar 228) and/or singing along with the selected backing track 202, pursuant to a music practice session (or playback/recording session). In some instances, the user may intend to use the entire selected backing track 202 for the practice session, or a part thereof. The user interface 200 may include one or more features to facilitate selection of the part of the selected backing track 202 to use for the practice session. For instance, user interface 200 illustrates segment indicators 216 and 217, represented by square brackets and/or time indicators along the playback navigation bar 210. The segment indicators 216 and 217 may be user-interactable and/or -controllable to define the segment of the selected backing track 202 to play back while recording the music practice session. By way of illustrative example, the brackets of the segment indicators 216 and 217 may be draggable (e.g., via touch or other input) along the playback navigation bar 210 to facilitate definition of the segment of the selected backing track 202 to play back while recording the music practice session. As another example, the time indicators of the segment indicators 216 and 217 may comprise editable text fields, enabling users to enter time values to define the segment of the selected backing track 202 to play back while recording the music practice session. User interface 200 further illustrates a duration indicator 218, which may be implemented to indicate the duration of the segment of the selected backing track 202 that is currently selected (e.g., via the segment indicators 216 and 217). In the example shown in FIG. 2, the duration indicator 218 indicates the duration as a quantity of bars (e.g., "15 bars"), though other forms are possible (e.g., a quantity of beats, a number of song sections, a duration indicated in seconds and/or minutes).

In some implementations, as indicated above, beat detection and/or section detection processes may be performed on the selected backing track 202, and the beats and/or sections identified for the selected backing track 202 may be used to facilitate selection of a segment of the selected backing track 202 to use for playback while recording the music practice session. For instance, identified sections (e.g., intro, verse, chorus, bridge, instrumental, outro, etc.) from the selected backing track 202 may be presented in a list or array for selection by the user to define the segment of the selected backing track 202 to use for the music practice session. As another example, beats and/or measures identified in the selected backing track 202 may be used to define the segment of the selected backing track 202 to use for the music practice session (e.g., by snapping the segment indicators 216 and/or 217 to identified beats and/or measures, or otherwise modifying user-indicated segment boundaries to align with beats and/or measures). Such functionality can enable users to select segments of backing tracks that align with the musical structure of the backing track (e.g., beats and/or measures), which can enhance the coherence of the practice session.

User interface 200 includes a control 220 for initiating (i) playback of the selected backing track 202 (or the part thereof selected via the segment indicators 216 and 217, or other means) and (ii) recording of audio and/or video content. For instance, the system presenting the user interface 200 may comprise or be in communication with one or more playback devices (represented by headphones 230), such as speakers, headphones, earbuds, and/or others. User input directed to the control 220 may initiate sending of a signal representing the selected backing track 202 (or the selected segment thereof) to the playback device(s). Similarly, the system presenting the user interface 200 may comprise or be in communication with one or more recording devices, such as one or more microphones, line-in recording devices, and/or cameras. User input directed to the control 220 may initiate recording at the recording device(s) to capture recorded audio and/or video content. The initiation of the playback of the selected backing track 202 (or the selected part thereof) and the recording may be temporally synchronized (e.g., from the perspective of the system presenting the user interface 200).

User interface 200 illustrates a camera feed 222 showing a stream of image data captured via a camera in communication with the system presenting the user interface 200. In the example shown in user interface 200, the camera feed 222 captures a user 226 prepared to play a guitar 228 while the selected backing track 202 (or selected segment thereof) is playing for the music practice session. After selection of the control 220, the guitar playing of the user 226 may be recorded as recorded content (e.g., video and/or audio content), which may later be synchronously played back along with the selected backing track 202 (or selected segment thereof).

In some implementations, the initiation of the recording and the playback of the selected backing track 202 (or the selected segment thereof) may be modified based on one or more settings. For instance, user interface 200 illustrates conceptually illustrates a count-in feature 232 whereby a user may indicate an amount of time that the system will allow to elapse between selection of the control 220 and initiation of the recording and the playback of the selected backing track 202 (or the selected segment thereof). In some instances, such as where a segment of the selected backing track 202 is selected for playback during the music practice session, the count-in period may play the portion of the selected backing track 202 that precedes the segment that is selected for playback. In some implementations, the duration of the count-in period may be user-selectable and can be represented in various ways (e.g., a number of bars/measures or beats, an amount of time represented in seconds/minutes, etc.).

Furthermore, as indicated above, stem separation may be performed on the selected backing track 202 to identify audio stems represented in the selected backing track 202. In some implementations, the selected backing track 202 to be played back while recording the accompanying musical practice/performance of the user 226 can include a selection of one or more of the audio stems associated with the selected backing track 202. For instance, where a guitar stem is identified for the selected backing track 202, a user may provide input indicating that the selected backing track 202 is to be played back without the guitar stem (or with the volume of the guitar stem reduced), allowing the practice/performance of the user 226 to supply the guitar part for the selected backing track 202. The guitar stem may additionally or alternatively be suppressed during synchronized playback of the selected backing track 202 and the recorded content, allowing the recorded content to provide the guitar part of the selected backing track 202. As another example, a user may provide input indicating that the selected backing track 202 is to be played back without one or more vocals stem (or with the volume of such stems reduced).

Figure 3:
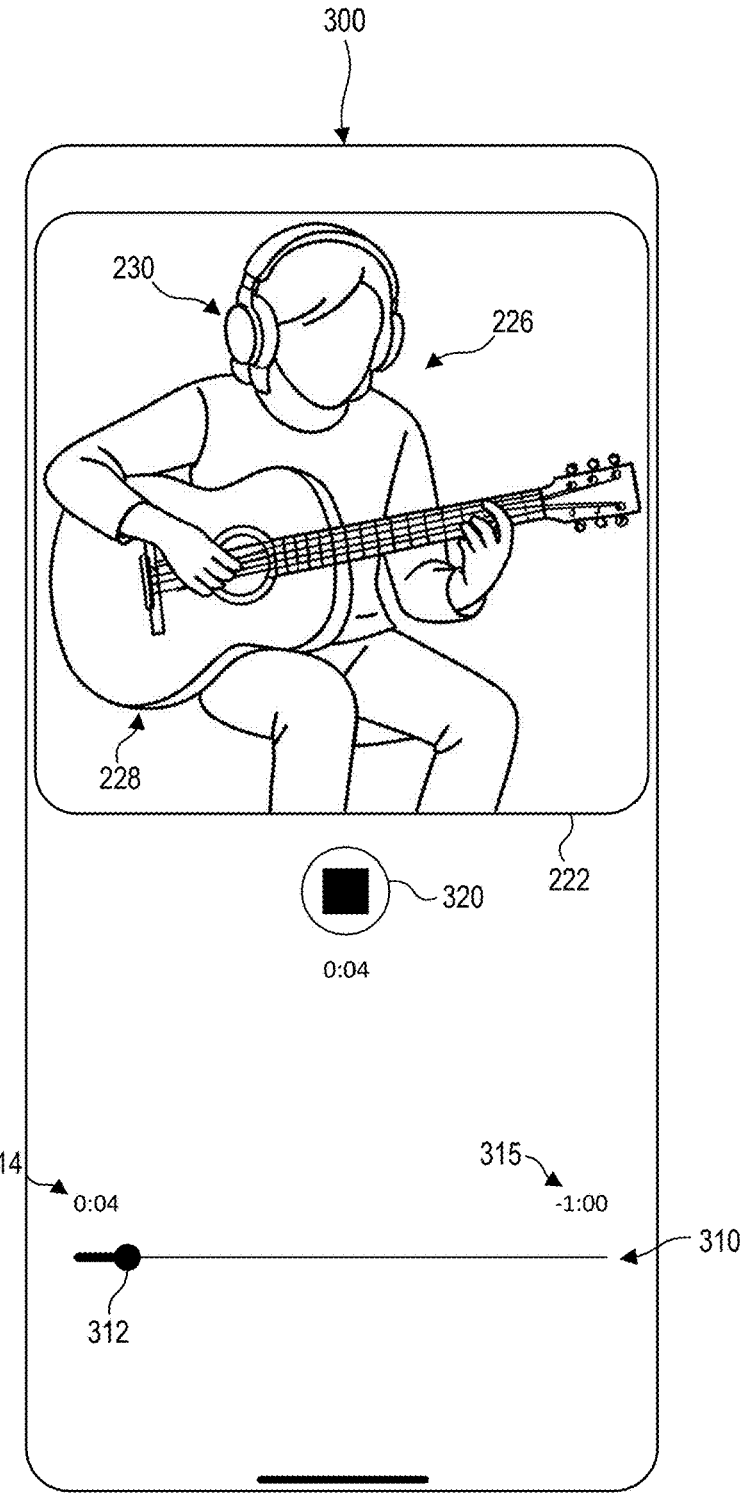

FIG. 3 illustrates example features of a user interface 300 that may be presented after selection of the control 220 shown and described hereinabove with reference to FIG. 2. For instance, user interface 300 may be presented after the synchronized initiation of (i) playback of the selected backing track 202 (or the selected segment thereof) on the headphones 230 and (ii) recording of the user 226 playing the guitar 228 (e.g., using one or more cameras and/or microphones in communication with the system presenting the user interface 200 and/or 300). The camera feed 222 shown in user interface 300 illustrates the recording (e.g., video and audio recording) of the user 226 playing the guitar 228 during playback of the selected backing track 202 (or selected segment thereof) on the headphones 230, allowing the user 226 to synchronize the playing of the guitar 228 with the playback of the selected backing track 202.

The example user interface 300 shown in FIG. 3 includes various features associated with controlling the recording and playback session. For instance, user interface 300 includes a playback navigation bar 310 associated with a playback position marker 312 and time indicators 314 and 315. The playback navigation bar 310 may represent the selected backing track 202, or the segment selected therefrom, with the playback position marker 312 indicating the current playback position as the selected backing track 202 is played back on the headphones 230. The time indicators 314 may indicate the current playback time, the remaining playback duration, the total duration, and/or other time-related information for playback of the selected backing track 202 (or selected segment thereof). The user interface 300 further includes a control 320 for stopping recording (and/or playback of the selected backing track 202).

Figure 4:
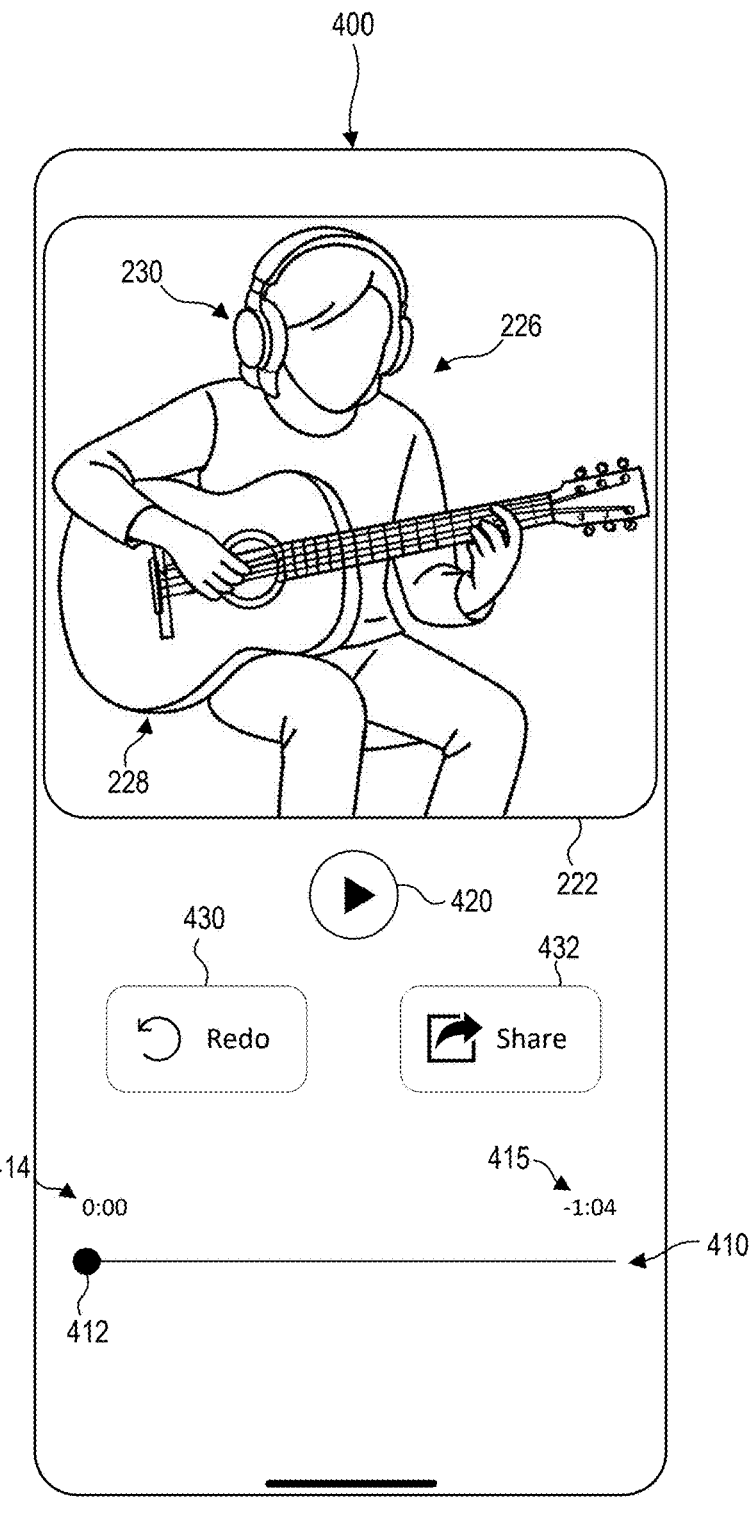

FIG. 4 illustrates example features of a user interface 400 that may be presented after completion of (i) recording of the user 226 playing the guitar 228 and (ii) playback of the selected backing track 202 (or the selected segment thereof) on the headphones 230. For instance, after playback of the selected backing track 202 (or selected segment thereof) is completed (or after user input is directed to control 320), the recording component(s) may cease recording, and the recorded content (e.g., audio and/or video) may be stored in one or more computer-readable recording media (e.g., locally, on cloud or remote resources, and/or in other memory). In the example shown in FIG. 4, the recorded content may be reviewed on the user interface 400, such as by utilizing a play/pause element 420 (or another form of user input) to trigger synchronized playback of the recorded content (e.g., audio and/or video) and the selected backing track 202 (or segment thereof). The user interface 400 can present a playback navigation bar 410, playback position marker 412, and/or time indicators 414 and 415 in conjunction with the synchronized playback. The user interface 400 can include controls 430 and/or 432 for redoing the recording/playback session and/or sharing the recorded content (e.g., synchronized with the relevant part of the selected backing track 202), respectively.

As noted above, in some implementations, the headphones 230 used to play the selected backing track 202 (or segment selected therefrom) may utilize one or more wireless communication channels that introduce latency between (i) the time that the playback command is issued (e.g., after selection of control 220 from FIG. 2) and (ii) the time that the headphones 230 begin to emit sound in accordance with the received audio signal. This delay can cause the user 226 to play the guitar 228 along with the delayed playback of the selected backing track 202, which delay can carry through to the recorded content. As will be described in more detail hereinbelow, the recorded audio content and the selected backing track 202 (or relevant part thereof) may be used as inputs to determine a temporal offset value, which may be used to facilitate synchronized playback of the recorded content and the selected backing track 202 (or relevant part thereof).

Figure 5:
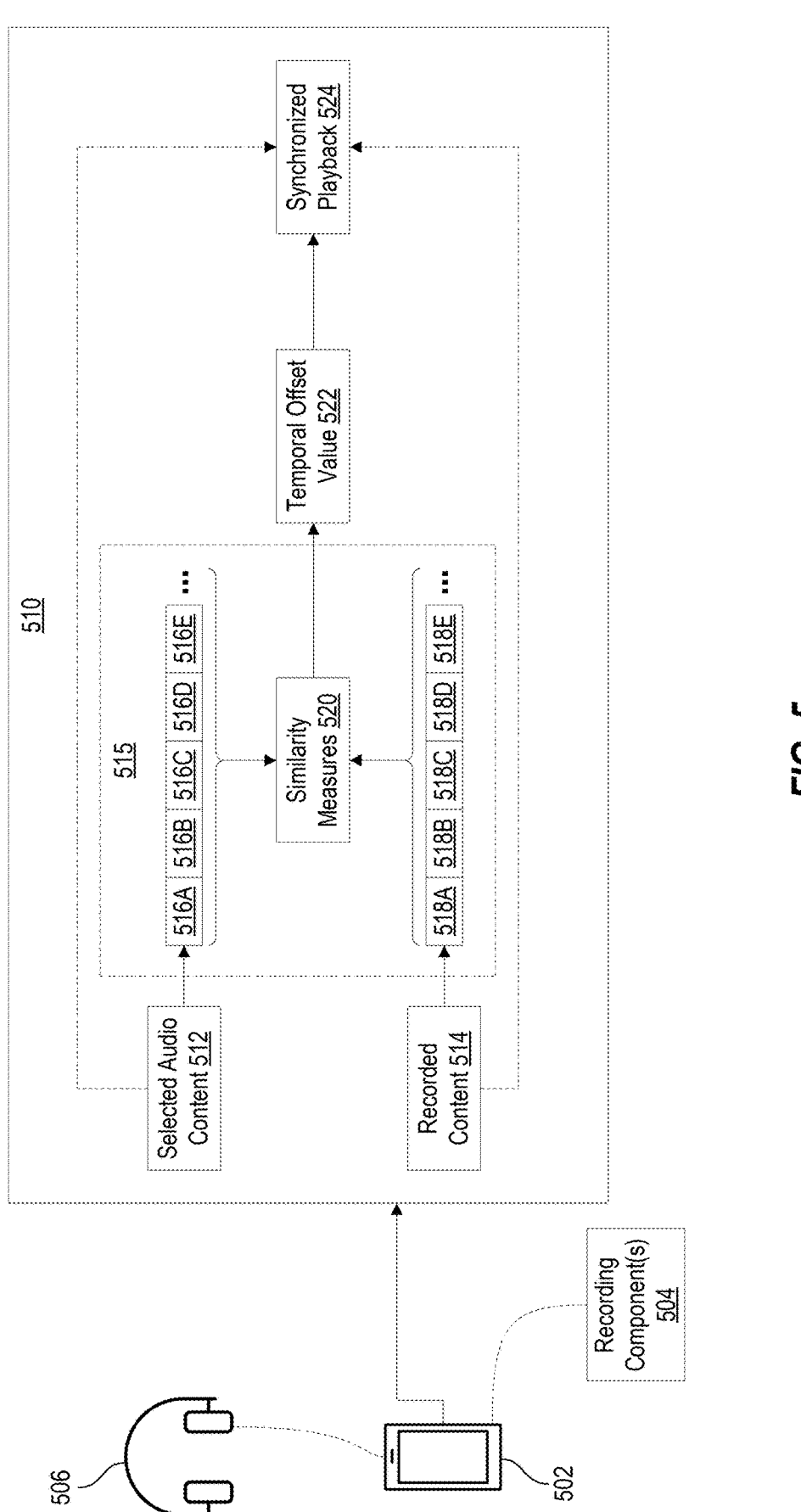
FIG. 5 illustrates an example flow diagram depicting operations and/or data objects/elements associated with aligning recorded content with selected audio content.

FIG. 5 illustrates data flow, components, and/or operations associated with associated with aligning recorded content with selected audio content. Although operations and/or data exchanges may be shown and/or described with reference to FIG. 5 in a particular order, no specific ordering is required unless explicitly stated or unless performance of one operation relies on completion of another. Furthermore, one will appreciate, in view of the present disclosure, that one or more operations and/or data exchanges shown in FIG. 5 may be omitted in certain instances and/or embodiments.

FIG. 5 depicts a user device 502, which may correspond to a system 700 described hereinafter (which may take on various forms). The user device 502 may be configured to perform functions and/or present features associated with one or more of the user interfaces 200, 300, 400 described hereinabove with reference to FIGS. 2, 3, and 4, respectively. For instance, the user device 502 may comprise or be in communication with one or more recording components 504, which may be utilized to record audio and/or video during playback of a selected backing track (or selected segment thereof). The recording component(s) 504 may take on various forms, such as one or more microphones, one or more line-in recording devices, one or more cameras, etc.

FIG. 5 illustrates that the user device 502 may comprise or be in communication with one or more playback components 506 (e.g., corresponding to the headphones 230 described above), which may comprise one or more transducers configured to emit sound based on a received audio signal. The playback component(s) 506 may take on various forms, such as one or more speakers, studio monitors, over-ear or on-ear headphones, earbuds, in-ear monitors, bone conduction headphones, neckband speakers, clothing items with built-in speakers, head-mounted displays/devices, smart glasses, and/or others.

The playback component(s) 506 may be configured to receive audio content (and/or signals/packages based thereon) from the user device 502 (or from another source as orchestrated by the user device 502, such as via a network connection between the playback component(s) 506 and a local or wide-area network). In some implementations, the component(s) 506 may be configured to receive audio content (and/or data/signals based thereon) using one or more wireless and/or wired connections/channels.

FIG. 5 illustrates flow diagram 510 depicting various operations, data objects, and/or entities associated with aligning recorded content with selected audio content. Flow diagram 510 depicts selected audio content 512, which may correspond to a backing track (e.g., selected backing track 202) or segment of a backing track selected, which may be selected as described hereinabove with reference to FIGS. 1 and/or 2. The selected audio content 512 may be played back via the playback component(s) 506 pursuant to a recording/playback session, as described above with reference to FIGS. 2, 3, and 4 (e.g., while the recording component(s) 504 capture recorded audio and/or video content). Flow diagram 510 furthermore depicts recorded content 514, which may include recorded audio content that is acquired/recorded pursuant to a recording/playback session as described above with reference to FIGS. 2, 3, and 4 (e.g., while the selected audio content 512 is played back via the playback component(s) 506). In some implementations, the recorded content 514 comprises or is associated with recorded video content (which may also be recorded while the selected audio content 512 is played back via the playback component(s) 506).

Flow diagram 510 conceptually depicts the selected audio content 512 and the recorded content 514 being processed as inputs to an alignment module 515 configured to generate a temporal offset value 522, which may be used to facilitate synchronized playback 524 of the selected audio content 512 and the recorded content 514. The alignment module 515 can be embodied as one or more software and/or hardware components, such as one or more discrete functions, classes, libraries, services within a larger program or system, which may be instantiated at runtime and executed via one or more processing units, or such as one or more dedicated circuits, programmable logic elements, preconfigured processing cores, etc.

The alignment module 515 can be configured to generate the temporal offset value 522 (e.g., using the selected audio content 512 and the recorded content 514 as inputs) by correlating feature frames (or windows/sets of feature frames) of the selected audio content 512 with feature frames (or windows/sets of feature frames) of the recorded content 514. For instance, flow diagram 510 conceptually depicts the alignment module 515 extracting feature frames 516A, 516B, 516C, 516D, 516E, from the selected audio content 512 (the ellipsis indicates that any quantity of feature frames may be extracted from the selected audio content 512). Flow diagram 510 furthermore depicts the alignment module 515 extracting feature frames 518A, 518B, 518C, 518D, and 518E from the recorded content 514 (the ellipsis indicates that any quantity of feature frames may be extracted from the recorded content 514). The feature frames extracted from the selected audio content 512 and the recorded content 514 can take on various forms. In one example, the feature frames can comprise Mel frequency spectrograms, linear or log-linear spectrograms, chroma features, energy representations, learned features extracted using one or more pretrained models, and/or others. The feature frames can comprise any frame width (e.g., within a range of about 10 ms to about 200 ms) and may implement a temporal overlap between adjacent frames (e.g., within a range of about 1 ms to about 100 ms).

The alignment module 515 may be configured to use the feature frames (or windows/sets of feature frames) extracted from the selected audio content 512 and the recorded content 514 to generate similarity metrics/values (i.e., similarity measures 520), which may serve as a basis for identifying corresponding sets of features between the two sets of feature frames. Corresponding sets of feature frames can comprise (i) a set of one or more feature frames extracted from the selected audio content 512 and (ii) a set of one or more feature frames extracted from the recorded content 514, where both sets are determined to represent the same musical moment(s) of the underlying musical work (e.g., the selected audio content 512). The similarity measures 520 may take on various forms and may capture similarities in perceptual, structural, semantic, rhythmic, harmonic, tonal, functional, and/or other characteristics of the underlying feature frames. For instance, the similarity measures 520 may comprise cosine similarity metrics, distance metrics, correlation-based measurements, divergence measurements, mutual information, embedding-based measures, perceptual/psychoacoustic measures, and/or other metrics determined between different feature frames.

In some implementations, for a given set of feature frames extracted from the selected audio content 512, the alignment module 515 is configured to determine similarity measures 520 between the given set of feature frames extracted from the selected audio content 512 and a set of feature frames extracted from the recorded content 514. The set of feature frames (extracted from the recorded content 514) that is selected for comparison with the given set of feature frames (extracted from the selected audio content 512) may omit feature frames that temporally precede the given set of feature frame (e.g., by omitting feature frames from the recorded content 514 that are associated with a lower frame number or time index value than the given feature frame). For instance, because delay introduced by the playback component(s) 506 would be manifest in the recorded content

514, a feature frames from the recorded content 514 that corresponds to the given set of feature frames from the selected audio content 512 would be expected to occur at a later timepoint than the given set of feature frames. The alignment module 515 may thus be configured to refrain from searching backward in time relative to the given set of feature frames of the selected audio content 512 to identify a corresponding set of feature frames from the recorded content 514. The set of feature frames (extracted from the recorded content 514) that is selected for comparison with the given set of feature frames (extracted from the selected audio content 512) may be within a predetermined temporal proximity to the given feature frame (e.g., the beginnings of both sets of feature frames being within a range of 10 ms to 2 s to one another). For instance, because delay introduced by the playback component(s) 506 may be expected to be within a certain range (e.g., 34 ms to 200 ms for Bluetooth), a feature frame from the recorded content 514 that corresponds to the given feature frame from the selected audio content would be expected to occur within a similar time range. The alignment module 515 may thus be configured to define the set of feature frames (from the recorded content 514) for comparison with the given set of feature frames (from the selected audio content 512) to be within the predetermined temporal proximity to one another (e.g., the first or start feature frames of both sets may be within the predetermined temporal proximity to one another).

By way of illustrative example, the similarity measures 520 determined by the alignment module 515 may include a similarity measure for feature frames 516A and 518A, a similarity measure for feature frames 516A and 518B, a similarity measure for feature frames 516A and 518C, a similarity measure for feature frames 516A and 518D. The feature frames 518A, 518B, 518C, and 518D may form the set of feature frames compared with feature frame 516A. The feature frames 518A, 518B, 518C, and 518D do not temporally precede feature frame 516A (e.g., feature frames 516A and 518A have a common frame number or time index), and feature frames 518A, 518B, 518C, and 518D are within a temporal proximity to feature frame 516A. The similarity measures 520 may additionally include a similarity measure for feature frames 516B and 518B, a similarity measure for feature frames 516B and 518C, a similarity measure for feature frames 516B and 518D, a similarity measure for feature frames 516B and 518E, a similarity measure for feature frames 516C and 518C, a similarity measure for feature frames 516C and 518D, and so on.

Figure 6A:
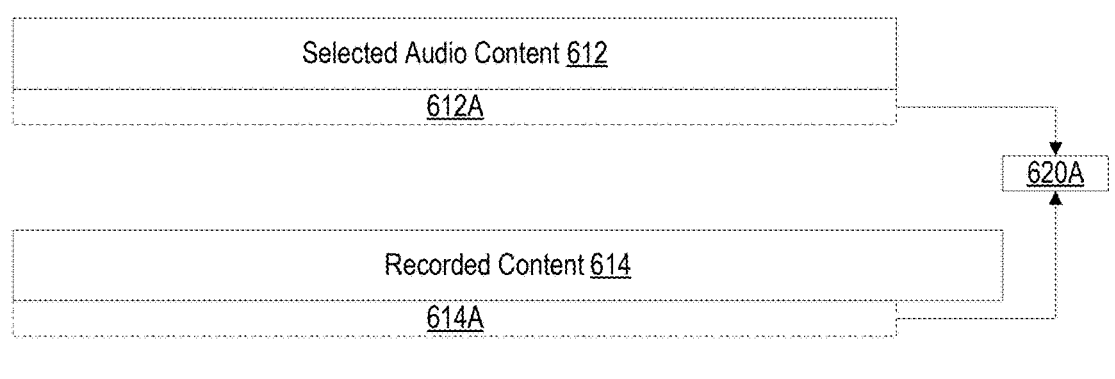
FIGS. 6A, 6B, and 6C illustrate a conceptual representation of an example of comparing sets of feature frames to determine similarity scores.

As another example, the similarity measures 520 may include similarity measures determined between windows or sets of feature frames extracted from the selected audio content 512 and the recorded content 514. For example, FIGS. 6A through 6C conceptually depict comparison of different sets of feature frames from the selected audio content and the recorded audio content to obtain different similarity scores, which can be used to determine the temporal offset value. For instance, FIG. 6A depicts selected content 612 (e.g., corresponding to selected audio content 512) and recorded content 614 (e.g., corresponding to recorded content 514). FIG. 6A further depicts a set of feature frames 612A from the selected audio content 612, which may comprise one or more feature frames extracted from the selected audio content 612. FIG. 6A also depicts a set of feature frames 614A from the recorded content 614, which may comprise one or more feature frames extracted from the recorded content 614. FIG. 6A includes a time scale labeled, t, for reference. In the example shown in FIG. 6A, the temporal length of the sets of feature frames 612A and 614A corresponds to the length of the shorter of the selected audio content 612 and the recorded content 614, which can ensure comparable analysis. FIG. 6A furthermore conceptually depicts comparison of the set of feature frames 612A (from the selected audio content 612) with the set of feature frames 614A (from the recorded content 614) to obtain a similarity measure 620A (e.g., corresponding to one of the similarity measures 520).

Figure 6B:
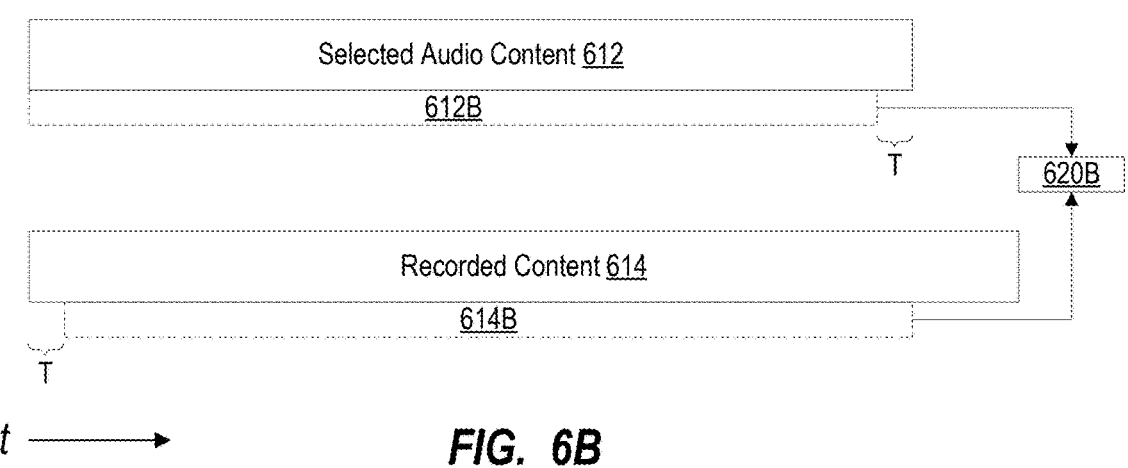

The alignment module 515 may define and compare other sets of feature frames from the selected audio content 612 and the recorded content 614 (e.g., in an iterative process) to obtain additional similarity measures, which may be used to determine the temporal offset value. For instance, FIG. 6B illustrates another set of feature frames 612B identified from the selected audio content 612 and another set of feature frames 614B identified from the recorded content 614. The sets of feature frames 612B and 614B are different/modified relative to the sets of feature frames 612A and 614A, respectively. For instance, FIG. 6B illustrates the set of feature frames 612B as omitting or trimming a subset of one or more feature frames from the end thereof (relative to the set of feature frames 612A), corresponding to removal of one unit of time (labeled "T" in FIG. 6B) from the temporal window of feature frames. FIG. 6B also illustrates the set of feature frames 614B as omitting/trimming a subset of one or more feature frames from the beginning thereof (relative to the set of feature frames 614A), which effectively slides the analysis window forward in time by a unit of time (labeled "T" in FIG. 6B). The sets of feature frames 612B and 614B are modified by the same unit of time, T, which can ensure that both windows/sets of feature frames contain the same number of feature frames for comparison. FIG. 6B also conceptually illustrates comparison of the sets of feature frames 612B and 614B to obtain a similarity measure 620B (e.g., corresponding to one of the similarity measures 520).

Figure 6C:
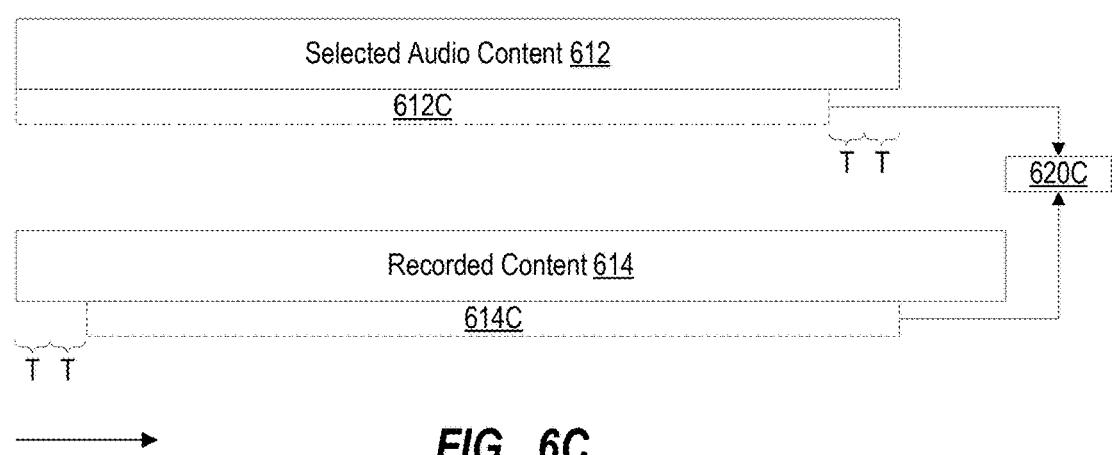

The alignment module 515 may perform any quantity of complementary and/or incremental trimming operations to define different (e.g., temporally reduced and/or shifted) sets of feature frames from the selected audio content 612 and the recorded content 614 to obtain any quantity of similarity measures. For instance, FIG. 6C illustrates another set of feature frames 612C from the selected audio content 612, which omits feature frames from the end thereof corresponding to two units of time, T, relative to the initial set of feature frames 612A. FIG. 6C also illustrates a set of feature frames from the recorded content 614 that omits feature frames from the beginning thereof corresponding to two units of time, T, relative to the initial set of feature frames 614A. The sets of feature frames 612C and 614C may be compared to obtain another similarity measure 620C. In some implementations, the alignment module 515 may refrain from reducing the temporal length of the windows of feature frames for comparison. For instance, the alignment module 515 may maintain the window length from one iteration to the next when subtracting the time units (e.g., T multiplied by the iteration number) from the length of the recorded content results in a temporal length that is greater than that of the selected audio content.

The similarity measures 520 may be used as a basis to determine the temporal offset value 522 for use in facilitating synchronized playback 524 of the selected audio content 512 and the recorded content 514. As an example, the alignment module 515 may identify a set of pairs of feature frames associated with similarity scores that satisfy one or more conditions. For instance, the alignment module 515 may select pairs of feature frames with similarity scores that satisfy a threshold similarity value, or the alignment module

515 may select a predetermined number of pairs of feature frames with the highest similarity scores. The alignment module 515 may identify the temporal disparities for each pair of feature frames in the set of pairs of feature frames, and the temporal offset value 522 may be defined using the identified temporal disparities. Any quantity of pairs of feature frames and/or temporal disparities may be identified to define the temporal offset value 522.

As an illustrative example, the set of pairs of feature frames identified by the alignment module 515 can include feature frames 516A and 516D as one pair, feature frames 516B and 516E as another pair, and feature frames 516C and 516E as another pair. The frame disparities identified by the alignment module 515 from the set of pairs of feature frames can include 3 frames (i.e., the disparity between feature frames 516A and 516D), 3 frames (i.e., the disparity between feature frames 516B and 516E), and 2 frames (i.e., the disparity between feature frames 516C and 516D). The alignment module 515 may define the temporal offset value 522 using the identified frame disparities, such as by defining the temporal offset value 522 based on an average, median, mode, or other aggregate measure of the identified frame disparities. In the foregoing example, with the identified frame disparities, of 3 frames, 3 frames, and 2 frames, the temporal offset value 522 may be defined as 3 frames (e.g., a median or mode of the identified frame disparities), which may be associated with an amount of time (e.g., within a range of about 34 ms to 200 ms).

As another illustrative example, referring to the example(s) shown and described with reference to FIGS. 6A, 6B, and 6C, the alignment module may identify one or more of the highest similarity measures (e.g., from among similarity measures 620A, 620B, 620C, etc.) and use the quantity of units of time (T) by which the associated sets of feature frames were trimmed/shifted relative to the initial window/set size to define the temporal offset value 522. For instance, where similarity measure 620 is identified as indicating the highest similarity, the temporal offset value may be defined as 2T (e.g., in view of the associated sets of feature frames 612C and 614C being trimmed and/or shifted by 2T relative to the initial sets of feature frames 612A and 614A, or in view of the set of feature frames 614C being trimmed to start 2T later than the beginning of the set of feature frames 612C).

The temporal offset value 522 may be used to facilitate synchronized playback 524 of the selected audio content 512 and the recorded content 514 (e.g., after receiving user input such as selection of play/pause element 420 as described hereinabove), as indicated in FIG. 5 by the arrows extending from the selected audio content 512, the recorded content 514, and the temporal offset value 522 to the synchronized playback 524. For instance, the temporal offset value 522 may be used to delay the playback of the selected audio content 512 to temporally align the selected audio content 512 with the recorded content 514 (in which the delay introduced by the playback component(s) 506 is manifest). As another example, the temporal offset value 522 may be used to trim or skip the beginning of the recorded content 514 to align the recorded content 514 with the recorded content 514 for playback.

To facilitate the synchronized playback 524, the selected audio content 512 and the recorded content 514 may be maintained as separate tracks/files that are played back together (e.g., using the temporal offset value 522 to facilitate synchronization), and/or the selected audio content 512 and the recorded content 514 may be used to construct a single temporally synchronized audio file/track. The temporal offset value 522 may be encoded in metadata of the selected audio content 512 and/or the recorded content 514 to facilitate synchronized playback thereof. As noted above, the recorded content 514 can include or be associated with recorded video content. The temporal offset value 522 may additionally be used to facilitate synchronized playback 524 of the recorded video content with the selected audio content 512 (e.g., by trimming/skipping beginning frames of the video content, and/or by delaying playback of the selected audio content 512 to align with the recorded video content). Additional processes may be performed on the recorded content 514 to facilitate the synchronized playback 524, such as mixing and/or mastering operations to facilitate blending of the recorded content 514 with the selected audio content 512.

In some implementations, the temporal offset value 522 is used to facilitate synchronized playback 524 after determining that the temporal offset value 522 is above a predetermined threshold (e.g., within a range of 0 ms to 150 ms, or another range). The temporal offset value 522 may be used for the synchronized playback automatically (e.g., after determining that the temporal offset value 522 satisfies the threshold(s)) and/or after receiving user input (e.g., after presenting a prompt on a user interface indicating that a temporal offset is detected, where the prompt may indicate the temporal offset value 522, enabling the user to accept application of the timing correction and/or use the temporal offset value 522 to apply the correction via other means).

Although one or more examples described herein have focused, in at least some respects, on using a part of an overall backing track for a playback/recording session (and subsequent temporally synchronized playback thereof with the recorded content), a selected segment of a backing track can include the entire backing track. Although one or more examples discussed herein have focused, in at least some respects, on implementations in which audio and video are recorded together, the principles described herein may be applied in the absence of video recording. Although one or more examples discussed herein have focused, in at least some respects, on the recording and playback of music practice sessions, the principles disclosed herein can be implemented to facilitate temporal alignment of a backing track (or segment thereof) with recorded singing and/or musical instrument playing for any purpose (e.g., music performance, content generation, etc.). One will appreciate, in view of the present disclosure, that specific aspects and/or functionality of the systems and/or user interfaces described herein are provided by way of example only and are not limiting of the principles described herein. Although one or more examples discussed herein have focused, in at least some respects, on determining and/or applying a temporal offset value to compensate for delay introduced by playback devices (which delay can be introduced by wired and/or wireless playback devices), the principles described herein may be applied to compensate for delay introduced by other sources, such as recording devices (e.g., audio interfaces). Furthermore, although one or more examples provided herein have focused, in at least some respects, on implementations where the recorded content is delayed relative to the selected audio content, the principles described herein may be implemented regardless of whether the recorded content is advanced or delayed relative to the selected audio content. In one example, the temporal length of the recorded content may be matched to that of the selected audio content via silence padding. Further silence padding may be added to the beginning and/or the end of the recorded content, and the amount of silence padding added to the beginning and/or the end of the recorded content may be based on the temporal length of the selected audio content (e.g., ½ of the temporal length of the selected audio content may be added to the beginning and the end of the recorded content). In some instances, if the difference in the temporal length of the recorded content and the selected audio content is greater than the amount of silence padding to be added (e.g., ½ of the temporal length of the selected audio content), the silence padding may be added only to the beginning of the recorded content. The alignment module may then iteratively compare the feature frames of the selected audio content with different sets/windows of feature frames from the recorded audio content, which may include portions of the silence padding, to obtain similarity measures. The sets/windows of feature frames from the recorded audio content that are compared to the feature frames of the selected audio content may be temporally shifted by a predefined step size (e.g., a predefined unit of time, T) while remaining fixed in temporal length over iterations (e.g., in contrast with the example(s) set forth with reference to FIGS. 6A, 6B, and 6C, where iterative/incremental window trimming is implemented). The similarity measures (and temporal shifting associated therewith) may be used to define the temporal offset value, which may be negative or positive.

Figure 7:
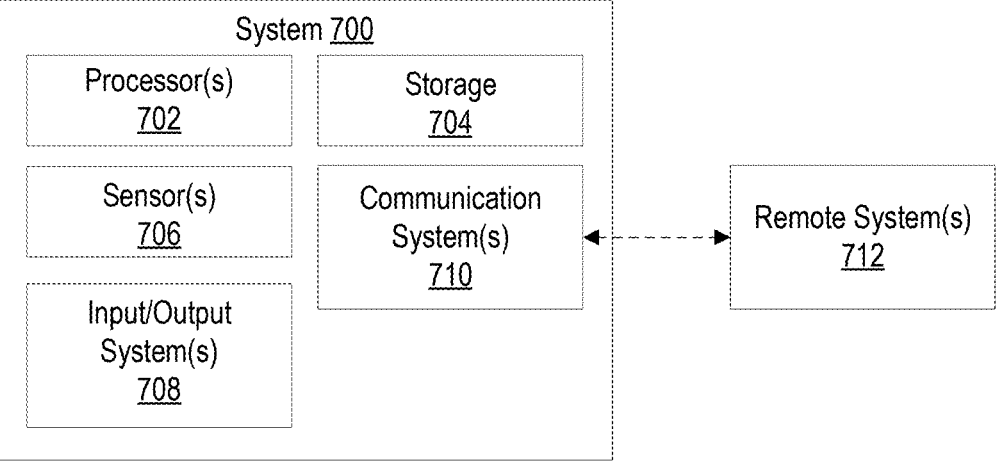
FIG. 7 depicts example components of a system that may comprise or be configurable to perform various embodiments.

FIG. 7 illustrates example components of a system 700 that may comprise or implement aspects of one or more disclosed embodiments. For example, FIG. 7 illustrates an implementation in which the system 700 includes processor(s) 702, storage 704, sensor(s) 706, I/O system(s) 708, and communication system(s) 710. Although FIG. 7 illustrates a system 700 as including particular components, one will appreciate, in view of the present disclosure, that a system 700 may comprise any number of additional or alternative components.

The processor(s) 702 may comprise one or more sets of electronic circuitries that include any number of logic units, registers, and/or control units to facilitate the execution of computer-readable instructions (e.g., instructions that form a computer program). Processor(s) 702 can take on various forms, such as CPUs, NPUs, GPUs, or other types of processing units. Such computer-readable instructions may be stored within storage 704. The storage 704 may comprise physical system memory and may be volatile, non-volatile, or some combination thereof. Furthermore, storage 704 may comprise local storage, remote storage (e.g., accessible via communication system(s) 710 or otherwise), or some combination thereof. Additional details related to processors (e.g., processor(s) 702) and computer storage media (e.g., storage 704) will be provided hereinafter.

In some implementations, the processor(s) 702 may comprise or be configurable to execute any combination of software and/or hardware components that are operable to facilitate processing using machine learning models or other artificial intelligence-based structures/architectures. For example, processor(s) 702 may comprise and/or utilize hardware components or computer-executable instructions operable to carry out function blocks and/or processing layers configured in the form of, by way of non-limiting example, single-layer neural networks, feed forward neural networks, radial basis function networks, deep feed-forward networks, recurrent neural networks, long-short term memory (LSTM) networks, gated recurrent units, autoencoder neural networks, variational autoencoders, denoising autoencoders, sparse autoencoders, Markov chains, Hopfield neural networks, Boltzmann machine networks, restricted Boltzmann machine networks, deep belief networks, deep convolutional networks (or convolutional neural networks), deconvolutional neural networks, deep convolutional inverse graphics networks, transformer networks, generative adversarial networks, liquid state machines, extreme learning machines, echo state networks, deep residual networks, Kohonen networks, support vector machines, neural Turing machines, combinations thereof (or combinations of components thereof), and/or others.

As will be described in more detail, the processor(s) 702 may be configured to execute instructions stored within storage 704 to perform certain actions. In some instances, the actions may rely at least in part on communication system(s) 710 for receiving data from remote system(s) 712, which may include, for example, separate systems or computing devices, sensors, servers, and/or others. The communications system(s) 710 may comprise any combination of software or hardware components that are operable to facilitate communication between on-system components/devices and/or with off-system components/devices. For example, the communications system(s) 710 may comprise ports, buses, or other physical connection apparatuses for communicating with other devices/components. Additionally, or alternatively, the communications system(s) 710 may comprise systems/components operable to communicate wirelessly with external systems and/or devices through any suitable communication channel(s), such as, by way of non-limiting example, Bluetooth, ultra-wideband, WLAN, infrared communication, and/or others.

FIG. 7 illustrates that a system 700 may comprise or be in communication with sensor(s) 706. Sensor(s) 706 may comprise any device for capturing or measuring data representative of perceivable phenomenon. By way of non-limiting example, the sensor(s) 706 may comprise one or more image sensors, microphones, thermometers, barometers, magnetometers, accelerometers, gyroscopes, and/or others.

Furthermore, FIG. 7 illustrates that a system 700 may comprise or be in communication with I/O system(s) 708. I/O system(s) 708 may include any type of input or output device such as, by way of non-limiting example, a display, a touch screen, a mouse, a keyboard, a controller, and/or others, without limitation.

Disclosed embodiments include at least those represented in the following clauses:

Clause 1. A system, the system comprising: one or more processors; and one or more computer-readable recording media that store instructions that are executable by the one or more processors to configure the system to: after receiving first user input, (i) initiate playback of selected audio content at one or more playback components and (ii) initiate audio recording at one or more recording components to obtain recorded audio content, the recorded audio content being recorded at least partially during the playback of the selected audio content; process the selected audio content and the recorded audio content as inputs to an alignment module to generate a temporal offset value, wherein the alignment module is configured to generate the temporal offset value by correlating feature frames of the selected audio content with feature frames of the recorded audio content; and after receiving second user input, initiate synchronized playback of the selected audio content and the recorded audio content, wherein the recorded audio content is synchronized with the selected audio content using the temporal offset value.

Clause 2. The system of any preceding clause, wherein the selected audio content comprises a segment of a backing track.

Clause 3. The system of any preceding clause, wherein the selected audio content comprises a selection of one or more audio stems of a backing track on which stem separation is performed.

Clause 4. The system of any preceding clause, wherein the initiating of the playback of the selected audio content and the audio recording is temporally synchronized.

Clause 5. The system of any preceding clause, wherein generating the temporal offset value comprises: extracting first feature frames from the selected audio content; extracting second feature frames from the recorded audio content; identifying one or more first sets of feature frames from the first feature frames; identifying one or more second sets of feature frames from the second feature frames; determining one or more similarity measures for one or more pairs of sets of feature frames, wherein each pair of sets of feature frames comprises a first set of feature frames from the one or more first sets of feature frames and a second set of feature frames from the one or more second sets of feature frames; and using one or more temporal offset values associated with the one or more pairs of sets of feature frames to define the temporal offset value.

Clause 6. The system of any preceding clause, wherein, for a pair of sets of feature frames of the one or more pairs of sets of feature frames, the second set of feature frames comprises feature frames of the second feature frames that do not temporally precede feature frames of the first set of feature frames.

Clause 7. The system of any preceding clause, wherein a first frame of the second set of feature frames is within a predetermined temporal proximity to a first frame of the first set of feature frames.

Clause 8. The system of any preceding clause, wherein the synchronized playback of the selected audio content and the recorded audio content comprises delaying playback of the selected audio content using the temporal offset value.

Clause 9. The system of any preceding clause, wherein the synchronized playback of the selected audio content and the recorded audio content comprises trimming or skipping a beginning of the recorded audio content using the temporal offset value.

Clause 10. The system of any preceding clause, wherein the audio recording is associated with video recording initiated after receiving the first user input to obtain recorded video content, and wherein the synchronized playback of the selected audio content and the recorded audio content further comprises synchronized playback of the recorded video content, wherein the recorded video content is synchronized with the selected audio content using the temporal offset value.

Clause 11. A system, the system comprising: one or more processors; and one or more computer-readable recording media that store instructions that are executable by the one or more processors to configure the system to: receive first user input selecting a segment of a backing track; after receiving second user input, (i) initiate playback of the segment of the backing track at one or more playback components via wireless communication with the one or more playback components, the one or more playback components introducing latency to the playback of the segment of the backing track, and (ii) initiate audio recording at one or more recording components to obtain recorded audio content, the recorded audio content being recorded at least partially during the playback of the segment of the backing track; process the segment of the backing track and the recorded audio content as inputs to an alignment module to generate a temporal offset value; and after receiving third user input, initiate synchronized playback of the segment of the backing track and the recorded audio content, wherein the recorded audio content is synchronized with the segment of the backing track using the temporal offset value to at least partially compensate for the latency introduced by the one or more playback components.

Clause 12. The system of any preceding clause, wherein the segment of the backing track comprises a selection of one or more audio stems of the backing track on which stem separation is performed.

Clause 13. The system of any preceding clause, wherein the initiating of the playback of the segment of the backing track and the audio recording is temporally synchronized.

Clause 14. The system of any preceding clause, wherein the alignment module is configured to generate the temporal offset value by correlating feature frames of the segment of the backing track with feature frames of the recorded audio content.

Clause 15. The system of any preceding clause, wherein generating the temporal offset value comprises: extracting first feature frames from the segment of the backing track; extracting second feature frames from the recorded audio content; identifying one or more first sets of feature frames from the first feature frames; identifying one or more second sets of feature frames from the second feature frames; determining one or more similarity measures for one or more pairs of sets of feature frames, wherein each pair of sets of feature frames comprises a first set of feature frames from the one or more first sets of feature frames and a second set of feature frames from the one or more second sets of feature frames; and using one or more temporal offset values associated with the one or more pairs of sets of feature frames to define the temporal offset value.

Clause 16. The system of any preceding clause, wherein, for a pair of sets of feature frames of the one or more pairs of sets of feature frames, the second set of feature frames comprises feature frames of the second feature frames that do not temporally precede feature frames of the first set of feature frames.

Clause 17. The system of any preceding clause, wherein a first frame of the second set of feature frames is within a predetermined temporal proximity to a first frame of the first set of feature frames.

Clause 18. The system of any preceding clause, wherein the synchronized playback of the segment of the backing track and the recorded audio content comprises (i) delaying playback of the segment of the backing track using the temporal offset value or (ii) trimming or skipping a beginning of the recorded audio content using the temporal offset value.

Clause 19. The system of any preceding clause, wherein the audio recording is associated with video recording initiated after receiving the first user input to obtain recorded video content, and wherein the synchronized playback of the segment of the backing track and the recorded audio content further comprises synchronized playback of the recorded video content, wherein the recorded video content is synchronized with the segment of the backing track using the temporal offset value.

Clause 20. A system, the system comprising: one or more processors; and one or more computer-readable recording media that store instructions that are executable by the one or more processors to configure the system to: after receiving first user input, initiate audio recording at one or more recording components to obtain recorded audio content; process the recorded audio content and selected audio content as inputs to an alignment module to generate a temporal offset value, wherein the alignment module is configured to generate the temporal offset value by correlating feature frames of the selected audio content with feature frames of the recorded audio content; and after receiving second user input, initiate synchronized playback of the selected audio content and the recorded audio content, wherein the recorded audio content is synchronized with the selected audio content using the temporal offset value.

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are one or more "physical computer storage media" or "computer-readable recording media" or "hardware storage device(s)." Computer-readable media that merely carry computer-executable instructions without storing the computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in hardware in the form of computer-executable instructions, data, or data structures and that can be accessed by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry program code in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Disclosed embodiments may comprise or utilize cloud computing. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Those skilled in the art will appreciate that at least some aspects of the invention may be practiced in network computing environments with many types of computer system configurations, including, personal computers, desktop computers, laptop computers, message processors, hand-held devices, multi-processor systems, microprocessor-based or programmable consumer electronics, network PCs, mini-computers, mainframe computers, mobile telephones, PDAs, pagers, routers, switches, wearable devices, and the like. The invention may also be practiced in distributed system environments where multiple computer systems (e.g., local and remote systems), which are linked through a network (either by hardwired data links, wireless data links, or by a combination of hardwired and wireless data links), perform tasks. In a distributed system environment, program modules may be located in local and/or remote memory storage devices.

Alternatively, or in addition, at least some of the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), central processing units (CPUs), graphics processing units (GPUs), and/or others.

As used herein, the terms "executable module," "executable component," "component," "module," or "engine" can refer to hardware processing units or to software objects, routines, or methods that may be executed on one or more computer systems. The different components, modules, engines, and services described herein may be implemented as objects or processors that execute on one or more computer systems (e.g., as separate threads).

One will also appreciate how any feature or operation disclosed herein may be combined with any one or combination of the other features and operations disclosed herein. Additionally, the content or feature in any one of the figures may be combined or used in connection with any content or feature used in any of the other figures. In this regard, the content disclosed in any one figure is not mutually exclusive and instead may be combinable with the content from any of the other figures.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is currently claimed is:

1. A system, the system comprising:
one or more processors; and
one or more computer-readable recording media that store instructions that are executable by the one or more processors to configure the system to:
after receiving first user input, (i) initiate playback of selected audio content at one or more playback components and (ii) initiate audio recording at one or more recording components to obtain recorded audio content, the recorded audio content being recorded at least partially during the playback of the selected audio content;
process the selected audio content and the recorded audio content to generate a temporal offset value by correlating feature frames of the selected audio content with feature frames of the recorded audio content, wherein generating the temporal offset value comprises:
extracting first feature frames from the selected audio content;
extracting second feature frames from the recorded audio content;
identifying one or more first sets of feature frames from the first feature frames;
identifying one or more second sets of feature frames from the second feature frames;
determining one or more similarity measures for a plurality of pairs of sets of feature frames, wherein each pair of sets of feature frames comprises a first set of feature frames from the one or more first sets of feature frames and a second set of feature frames from the one or more second sets of feature frames;
for each of the plurality of pairs of sets of feature frames, identifying a respective frame disparity; and
using an aggregate measure of a plurality of the respective frame disparities to define the temporal offset value; and
after receiving second user input, initiate synchronized playback of the selected audio content and the recorded audio content, wherein the recorded audio content is synchronized with the selected audio content using the temporal offset value.

2. The system of claim 1, wherein the selected audio content comprises a segment of a backing track.

3. The system of claim 1, wherein the selected audio content comprises a selection of one or more audio stems of a backing track on which stem separation is performed.

4. The system of claim 1, wherein the initiating of the playback of the selected audio content and the audio recording is temporally synchronized.

5. The system of claim 1, wherein, for a pair of sets of feature frames of the plurality of pairs of sets of feature frames, the second set of feature frames only comprises feature frames of the second feature frames that do not temporally precede feature frames of the first set of feature frames.

6. The system of claim 5, wherein a first frame of the second set of feature frames is within a predetermined temporal proximity to a first frame of the first set of feature frames.

7. The system of claim 1, wherein the synchronized playback of the selected audio content and the recorded audio content comprises delaying playback of the selected audio content using the temporal offset value.

8. The system of claim 1, wherein the synchronized playback of the selected audio content and the recorded audio content comprises trimming or skipping a beginning of the recorded audio content using the temporal offset value.

9. The system of claim 1, wherein the audio recording is associated with video recording initiated after receiving the first user input to obtain recorded video content, and wherein the synchronized playback of the selected audio content and the recorded audio content further comprises synchronized playback of the recorded video content, wherein the recorded video content is synchronized with the selected audio content using the temporal offset value.

10. The system of claim 1, wherein the aggregate measure comprises an average, median, or mode of the plurality of the respective frame disparities.

11. A method, the method comprising:

after receiving first user input, (i) initiating playback of selected audio content at one or more playback components and (ii) initiating audio recording at one or more recording components to obtain recorded audio content, the recorded audio content being recorded at least partially during the playback of the selected audio content;

processing the selected audio content and the recorded audio content to generate a temporal offset value by correlating feature frames of the selected audio content with feature frames of the recorded audio content, wherein generating the temporal offset value comprises:

extracting first feature frames from the selected audio content;

extracting second feature frames from the recorded audio content;

identifying one or more first sets of feature frames from the first feature frames;

identifying one or more second sets of feature frames from the second feature frames;

determining one or more similarity measures for a plurality of pairs of sets of feature frames, wherein each pair of sets of feature frames comprises a first set of feature frames from the one or more first sets of feature frames and a second set of feature frames from the one or more second sets of feature frames;

for each of the plurality of pairs of sets of feature frames, identifying a respective frame disparity; and using an aggregate measure of a plurality of the respective frame disparities to define the temporal offset value; and after receiving second user input, initiating synchronized playback of the selected audio content and the recorded audio content, wherein the recorded audio content is synchronized with the selected audio content using the temporal offset value.

12. The method of claim 11, wherein the selected audio content comprises a selection of one or more audio stems of a backing track on which stem separation is performed.

13. The method of claim 11, wherein the initiating of the playback of the selected audio content and the audio recording is temporally synchronized.

14. The method of claim 11, wherein, for a pair of sets of feature frames of the plurality of pairs of sets of feature frames, the second set of feature frames only comprises feature frames of the second feature frames that do not temporally precede feature frames of the first set of feature frames.

15. The method of claim 14, wherein a first frame of the second set of feature frames is within a predetermined temporal proximity to a first frame of the first set of feature frames.

16. The method of claim 11, wherein the synchronized playback of the selected audio content and the recorded audio content comprises delaying playback of the selected audio content using the temporal offset value.

17. The method of claim 11, wherein the synchronized playback of the selected audio content and the recorded audio content comprises trimming or skipping a beginning of the recorded audio content using the temporal offset value.

18. The method of claim 11, wherein the audio recording is associated with video recording initiated after receiving the first user input to obtain recorded video content, and wherein the synchronized playback of the selected audio content and the recorded audio content further comprises synchronized playback of the recorded video content, wherein the recorded video content is synchronized with the selected audio content using the temporal offset value.

19. The method of claim 11, wherein the aggregate measure comprises an average, median, or mode of the plurality of the respective frame disparities.

20. One or more computer-readable recording media that store instructions that are executable by one or more processors of a system to configure the system to:

after receiving first user input, (i) initiate playback of selected audio content at one or more playback components and (ii) initiate audio recording at one or more recording components to obtain recorded audio content, the recorded audio content being recorded at least partially during the playback of the selected audio content;

process the selected audio content and the recorded audio content to generate a temporal offset value by correlating feature frames of the selected audio content with feature frames of the recorded audio content, wherein generating the temporal offset value comprises:

extracting first feature frames from the selected audio content;

extracting second feature frames from the recorded audio content;

identifying one or more first sets of feature frames from the first feature frames;

identifying one or more second sets of feature frames from the second feature frames;

determining one or more similarity measures for a plurality of pairs of sets of feature frames, wherein each pair of sets of feature frames comprises a first set of feature frames from the one or more first sets of feature frames and a second set of feature frames from the one or more second sets of feature frames;

for each of the plurality of pairs of sets of feature frames, identifying a respective frame disparity; and using an aggregate measure of a plurality of the respective frame disparities to define the temporal offset value; and after receiving second user input, initiate synchronized playback of the selected audio content and the recorded audio content, wherein the recorded audio content is synchronized with the selected audio content using the temporal offset value.

\*　\*　\*　\*　\*